United States Patent Office 3,505,047
Patented Apr. 7, 1970

3,505,047
PROCESS AND APPARATUS FOR ELECTRO-
CHEMICALLY MODIFICATION OF GLASS
Emile Plumat, Gilly, Belgium, assignor to
Glaverbel S.A., Brussels, Belgium
Continuation-in-part of application Ser. No. 286,302,
June 7, 1963. This application May 4, 1966, Ser.
No. 547,457
Claims priority, application Luxembourg, May 6, 1965,
48,533
The portion of the term of the patent subsequent
to July 23, 1985, has been disclaimed
Int. Cl. C03c 21/00; C03b 18/00; B01k 3/00
U.S. Cl. 65—30        13 Claims

ABSTRACT OF THE DISCLOSURE

A process and associated apparatus for electrochemical modification of glass which includes feeding molten glass from a bath to a sheet glass forming unit while maintaining an atmospheric ion source in contact with the bath surface and applying an electric field of variable polarity between a subsurface layer of the bath and the atmosphere to effect controlled diffusion of ions into or out of the molten glass surface, with apparatus including a sheet glass forming unit, a vessel for containing the molten glass, gaseous atmosphere discharge element, and electrodes.

---

This application is a continuation-in-part of my copending application Ser. No. 286,302, filed June 7, 1963, now abandoned.

The present invention relates to the field of glass manufacture and particularly the manufacture of sheet glass. The present invention is primarily, but not exclusively, concerned with processes for manufacturing sheet glass by drawing.

It is well known to modify the composition of molten glass during its displacement through the working end of a glass melting furnace by causing an ion exchange to take place between the molten glass and a hot atmosphere in contact therewith. The composition of the resulting sheet glass can be favorably influenced by the diffusion of ions, such as alkaline metal ions for example, of a suitable ionized material from the atmospheric into the molten glass at the surface of the glass bath.

However, it has not heretofore been possible to give the final glass sheet a predetermined composition with any consistency by controlling the composition of the atmosphere from which such diffusion is to take place. In fact, experience has shown that the properties of the resulting glass sheet made from a glass bath which has undergone such treatment are often substantially different from those required. This is primarily true because the extent to which diffusion will take place is substantially unpredictable. It has generally been found that the quality of the surfaces of sheets made of a glass which has been subjected to such treatments is rather poor.

It is a primary object of the present invention to eliminate these drawbacks and difficulties.

Another object of the present invention is to improve the properties of the glass sheets formed from a mass of molten glass.

Yet another object of the instant invention is to provide a novel process for treating molten glass.

A still further object of the present invention is to permit an accurately controlled diffusion of ions into the surface of a molten glass bath.

According to the present invention, these and other objects are achieved by the provision of a method of making glass sheets which includes the operations of providing a bath of molten glass, feeding glass from a surface region thereof to a sheet glass forming unit, and maintaining an atmosphere in contact with the surface of the bath. The method further includes the operation of applying an electric field between a subsurface layer of the bath and the atmosphere.

The present invention also involves apparatus for use in the manufacture of sheet glass, which apparatus generally includes a sheet glass forming unit and a vessel for holding a bath of molten glass and for maintaining an atmosphere in contact with such bath. The apparatus further includes means for feeding glass from the bath to the forming unit for causing the glass to be formed into a sheet, and means for applying an electric field between the atmosphere and a subsurface layer of the bath.

In apparatus for drawing molten glass into sheet form; a glass drawing machine normally draws molten glass upwardly from a meniscus to which glass at the surface of the bath flows from opposite directions. In accordance with the present invention, the glass flowing to the drawing zone from each side of the meniscus will be traversed by an electric field of the type mentioned above.

The precise effect which the electric field will have in any given cause depends, among other things, on the direction and intensity of the electric field and on the composition of the atmosphere with respect to that of the molten glass. Any one of a wide variety of modifications may be imparted to the glass by a proper choice of these factors.

Additional objects and advantages of the present invention will become apparent upon consideration of the following description when taken in conjunction with the accompanying drawings in which.

Figure 1:
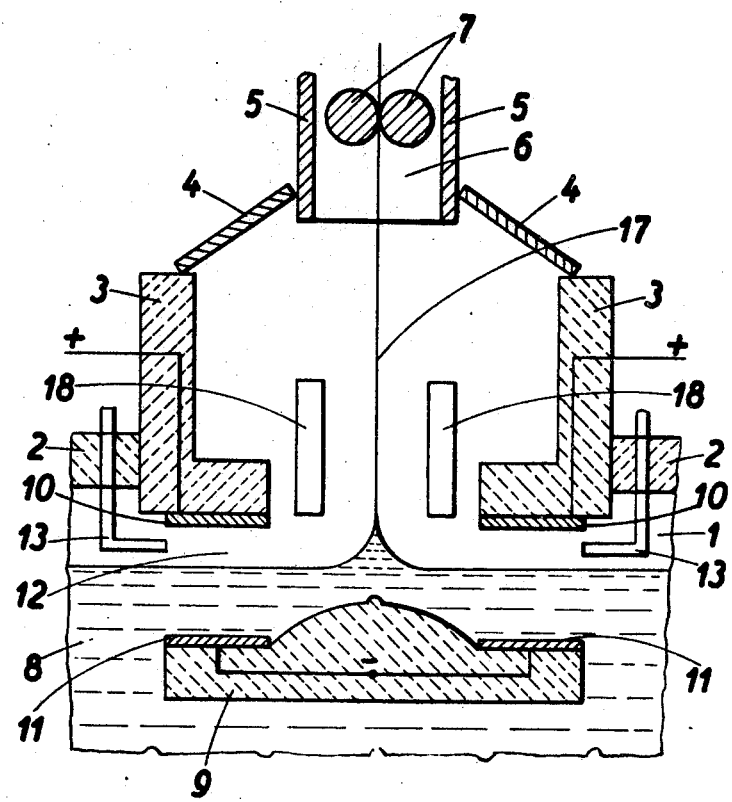
FIGURE 1 is an elevational, cross-sectional, detail view of a portion of an installation according to the present invention.

Referring first to FIGURE 1, there is shown a glass processing installation for making sheet glass according to the Pittsburgh process. Molten glass in a bath 8 flows along a furnace tank to the working end 1 of the tank. This end of the tank is provided with a cover member 2. Molten glass is then drawn upwardly from the upper layers of bath 8 into a drawing chamber having front and rear L-shaped shields 3 which are fitted into the cover member 2 and which are connected by inclined walls 4 to the lower ends of the walls 5 of a drawing tower 6. Within tower 6 are provided a plurality of pairs of forming rollers 7, only the lower pair of which is shown. As it is drawn upwardly, the sheet 17 is cooled by two coolers 18 disposed in the drawing chamber on opposite sides of the sheet.

There is also provided a draw bar 9 which extends across the entire width of the working end 1 of the furnace tank, this width extending in a direction perpendicular to the plane of the figure, and which is immersed in the molten glass bath 8 directly below the drawing chamber. This draw bar 9 serves to stabilize the position of the meniscus which is formed at the base of the upwardly-drawn glass sheet and to which molten glass at the surface of the bath feeds from two opposite directions.

For providing an electric field, there are arranged two upper electrodes 10, which are secured to the bottom surfaces of the horizontal legs of shields 3, and two lower electrodes 11 mounted on top of draw bar 9. There are also provided two tubes 13 which extend through the cover member 2 and which each has an outlet end opening into the space 12 extending between the upper electrodes 10 and the surface of glass bath 8. These pipes are provided for conveying ions and for discharging them into the space 12 where they will be subjected to the action of the electric field extending between the electrodes 10 and 11.

Figure 2:
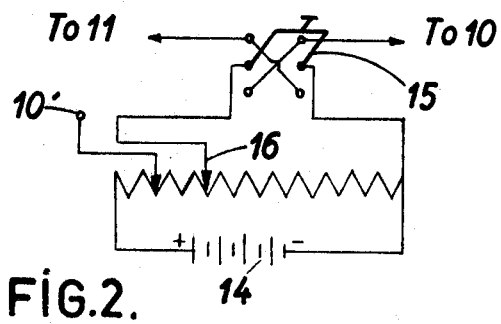
FIGURE 2 is a schematic diagram of a voltage source for use with the arrangements of FIGURES 1 and 3.

The electric field is estalibshed by connecting the electrodes 10 and 11 to a suitable voltage source. One such voltage source is shown in FIGURE 2 to include a source of D.C. voltages 14 connected across a voltage amplitude regulator 16, here in the form of a potentiometer. A polarity-reversing switch has one side connected between one end and the primary movable tap of potentiometer 16, and has its other side provided with conductors for connection to the electrodes 10 and 11. In some cases it may be desired to apply different potentials to the two electrodes 10 in order to produce different field strengths on opposite sides of the meniscus. Such an arrangement may be useful, for example, when it is desired to impart different properties to the two surface layers of the resulting glass sheet 17. In order to permit such a result to be achieved, one of the electrodes 10 may be connected to one of the output terminals of switch 15 and the other electrode 10 may be connected to a terminal 10' of an auxiliary, independently movable tap of potentiometer 16.

During the formation of sheet glass in the apparatus of FIGURE 1, one type of treating process according to the present invention may be carried out by connecting the electrodes 10 and 11 to the voltage source so that the electrodes 10 are positive with respect to the electrodes 11. This causes a potential difference to exist between the upper and lower electrodes so that the molten glass and the atmosphere in space 12 form an electrochemical system in which positive ions move in a downward direction.

If, under these conditions, the atmosphere in space 12 contains free ions having a suitable polarity, such ions will diffuse into the glass of bath 8. Whether, and to what extent, such diffusion takes place will depend on the mobility of the ions, the direction and strength of the electric field, and the electrical value of the diffusion barrier constituted by the glass-atmosphere interface. The rate of diffusion can be controlled simply by varying the strength of the electric field.

If ions are to be diffused from the atmosphere into the molten glass, the necessary concentration of ions in the atmosphere can be maintained by continuously or intermittently discharging such ions into the atmosphere in the vicinity of the electric field through pipes 13. The nature of the material thus introduced in ionized form may be rapidly changed when desired. Also, if desired, different types of ions may be simultaneously introduced into the atmosphere for diffusion into the glass and, in such cases, the concentration of each type of ion in the atmosphere can be independently controlled.

Such a diffusion of ions into the molten glass can be made to produce a modification of the glass composition at least at the surface region thereof which is in contact with the atmosphere. The composition of the atmosphere may be suitably chosen to achieve any one of a wide variety of modifications. Such modifications, may for example, lead to an improvement in one or more of the chemical, mechanical, or optical properties of the resulting glass product. Specifically, the resistance of the resulting glass product to corrosion by atmospheric or chemical agents can be appreciably improved by enriching a surface layer of the glass bath with calcium or magnesium. Furthermore, certain optical properties, such as the luster, of the final product may be improved by diffusing lead, tin, or barium into the molten bath. To cite another example, at least part of a glass layer may be tinted by diffusing into it ions such as those as one of the following materials: iron, manganese, nickel, cobalt, copper and selenium. In addition, the coefficient of thermal expansion of the resulting glass product can be appreciably modified by replacing some of the sodium ions in the upper surface layer of the molten bath by other ions, such as those of lithium or potassium.

Processes can also be carried out according to present invention in which no diffusion of ions takes place from the atmosphere into the molten bath. According to these processes, the electric field between electrodes 10 and 11 can be employed to produce a migration of ions from the upper surface layers of the bath toward the subsurface layers thereof. Such a migration can, in certain cases, produce a benecial modication of the composition of the glass disposed in the surface region of the bath. For example, the electric field can be used to produce a migration of alkaline metal ions toward the subsurface layers of the bath so as to cause the upper surface layer to be less rich in these ions, it being appreciated that it is ths upper surface layer from which glass is drawn to form the sheet 17. When this upper surface layer is thus made less rich in alkaline metal ions, the resulting glass sheet will have an improved resistance to the action of weathering agents.

In further accordance with the present invention, processes may be carried out in which such diffusion and/or migration effects are not produced across the entire surface area of the bath. According to these processes, the electric field can be localized so as to produce such effects only in one or more limited zones across the bath surface.

It may be noted at this point that while the present invention is primarily concerned with the manufacture of glass by drawing operations, the invention can be applied equally well to processes where the glass sheets are formed by rolling, such processes being employed, for example, in the formation of patterned glass.

The lower electrode provided according to the present invention is preferably mounted on some structural part of the apparatus with which it is associated. For example, if the apparatus constitutes a Pittsburgh glass drawing machine, the lower electrodes may be mounted on the draw bar or "debitiuse" provided in such machines. In the arrangement of FIGURE 1, for example, the lower electrodes 11 are mounted on the draw bar 9. This arrangement assures that the rigidity of the lower electrode will be maintained so that the electrode will be highly resistant to deformation at the high temperature to which it is exposed. Alternatively, the lower electrode may actually be constituted by a structural part of a portion thereof, such as a draw bar for example, which also serves some other purpose in the apparatus. In certain cases, the vessel, or a portion thereof, can be made of an electrically conductive material and can be arranged to itself to serve as the lower electrode. This latter alternative permits a lower electrode of relatively large size to be provided without appreciably complicating the construction of the apparatus.

The upper electrode, or electrodes, and the lower electrode, or electrodes, may each be connected to one side of a voltage source of the type shown in FIGURE 2. Alternatively, more than one lower electrode and/or more than ane upper electrode may be provided and may be arranged so that electric fields of different strengths are maintained in different regions across the surface of the molten bath. This may be achieved, as has been described above in connection with FIGURE 2, by applying different potentials to different upper electrodes. The same result may be attained by applying different voltage potentials to each of a plurality of lower electrodes. This result can also be achieved by varying the spacing between upper electrodes and lower electrodes from one region to another across the surface of the molten bath. In the arrangement of FIGURE 1, this can be easily accomplished by merely varying the height of one of the upper electrodes 10. Additional means may also be provided for independently varying the field strength in different regions across the surface of the glass bath.

In one exemplary process carried out according to the present invention during the manufacture of soda-lime glass, ionized lithium chloride was discharged through tubes 13 into the region of space 12 through which the electric field extends. The current flow in milliamperes between the electrodes was measured, as was the temperature of the molten glass bath for various voltages between the electrodes 10 and 14. The distance between the two upper electrodes 10 and the two lower electrodes 11, was about 35 mm.

Figure 4:
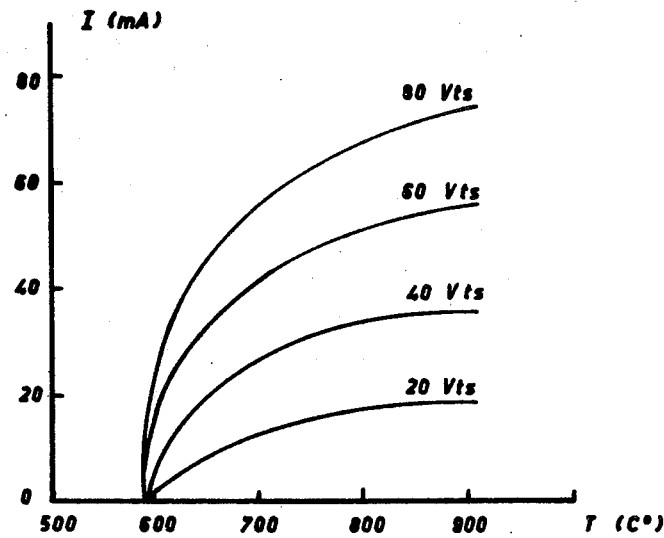
FIGURE 4 is a chart showing the operation of arrangements according to the present invention.

The results of these tests are shown graphically in FIGURE 4 in the form of curves each of which represents variations in current as a function of the bath temperature for a respective one of the potential differences of 20, 40, 60 and 80 volts. In each case, the magnitude of the current represents a measure of the rate of diffusion of lithium ions into the glass. It may be noted that, for any given glass temperature, the amplitude of the current varies proportionally with the applied voltage.

Since in this test the lithium ions were made available on both sides of the meniscus and the electric field extended also on both sides of the meniscus, the replacement of sodium ions by lithium ions took place in those regions of the molten bath 8 from which both surfaces of the resulting glass sheet 17 were formed.

Subsequent tests performed on the resulting glass sheet showed that such diffusion of lithium ions into the surface layers, with a corresponding migration of sodium ions into the glass forming inner layers of the sheet, caused compressive forces to be set up in the glass due to differential contraction during cooling. As a result, the mechanical strength of the glass was improved in the same manner as that attained by conventional physical tempering treatments. It may thus be seen that the present invention permits a sort of chemical tempering to be effectuated which has the important advantage that the compressive forces are induced as a result of steps performed during the formation of the glass sheet rather than as the result of treatments performed after the sheet has been fabricated.

Another important advantage of the chemical tempering effect produced according to the present invention resides in the fact that it can be employed in the manufacture of thin glass sheets having a thickness of less than 6 mm. By way of comparison, 6 mm. has been found to be the minimum thickness at which sheet glass can be tempered by conventional methods.

It has been found that sheet glass having a thickness of about 6 mm. can have compressive forces of the order of about 8 kg./mm$^2$ induced therein when tempered by conventional methods. In tests performed on glass produced according to the present invention, it was found that a diffusion of lithium ions into the upper surface layers of the molten bath during the production of sheet glass having a thickness of 6 mm. caused the resulting sheets to exhibit compressive forces of the order of 5.8 kg./mm.$^2$. It was also found that glass which was subjected to a chemical tempering treatment according to the present invention in which magnesium salt was used instead of lithium salt, exhibited compressive forces of the order of 7.8 kg./mm.$^2$ after having been drawn into sheet form.

It should be understood that treatments can be carried out according to the present invention in which other types of ions are caused to diffuse into the bath so as to result in glass sheets whose surface layers exhibit other particular properties, the properties exhibited depending on the nature of the substance diffused into the molten bath.

Treatments can also be carried out according to the present invention which do not involve a diffusion of ions from the atmosphere in space 12 into the molten bath. These treatments can be carried out in order to effect only a migration of ions originally present in the glass away from the upper surface region thereof under the influence of the electric field. The most highly mobile ions, i.e., the alkaline metal ions, will undergo the highest degree of migration. As a result, both surfaces of the resulting glass sheet 17 will be poor in alkaline metal ions so that the glass sheet will have an improved resistance to the action of weathering agents.

Figure 3:
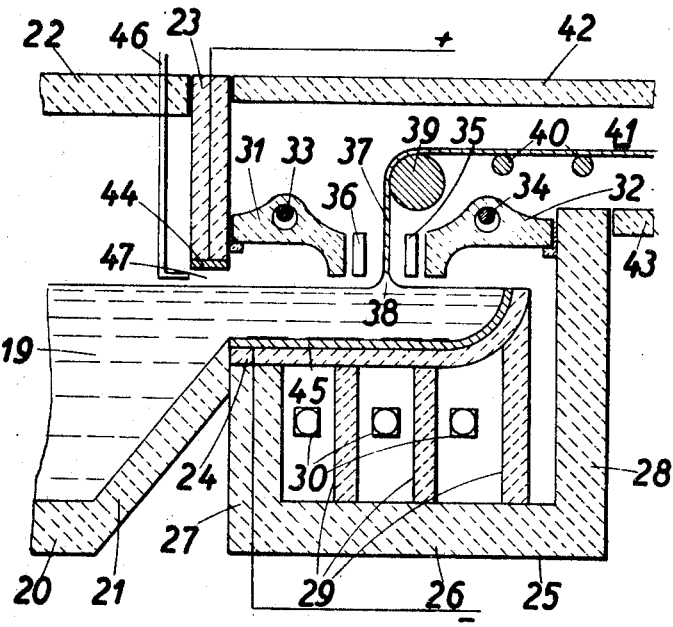
FIGURE 3 is a view similar to that of FIGURE 1 of another installation according to the present invention.

Referring now to FIGURE 3, there is shown another arrangement according to the present invention for drawing glass by the Libby-Owens process. In this arrangement, a bath 19 of molten glass flows from a refining compartment 20 of which the sole 21, the lid 22 and the upper end wall 23 are visible in the drawing. This molten glass flows into a drawing pot 24. Beneath this pot is disposed a chamber 25 constituted by a sole 26, rear wall 27, front wall 28, and two side walls. The drawing pot rests upon the wall 27 and three uprights 29 which are disposed within chamber 25. This chamber 25 is heated by gas flames from burners 30.

About the drawing pot 24 are arranged two reflecting shields 31 and 32, each of which is suspended from a respective one of the cooled cross bars 33 and 34 which pass through their respective shields. Between the reflecting shields 31 and 32 there are provided two coolers 35 and 36 for cooling the opposite faces of the glass sheet 37 as it is drawn upwardly from the meniscus 38 formed in the molten bath 19.

The glass sheet 37, after passing around the bending roller 39, is conveyed by rollers 40 through an annealing lehr 41 defined by an upper wall 42 and a sole 43.

An upper electrode 44 is attached to the bottom of vertical wall 23 and a lower electrode 45 is disposed to form the bottom of drawing pot 24. These electrodes 44 and 45 are connected to a voltage source of the type shown in FIGURE 2.

A tube 46 extends downwardly through the wall 2 and is provided with an outlet end which opens into the space 47 extending between electrode 44 and the surface of both 19. Tube 46 is provided for conveying ions and for discharging them into the space 47 where they will be subjected to the action of the electric field.

The diffusion of ions into the upper layers of molten glass bath 19 takes place in the same manner as in the arrangement of FIGURE 1. Similarly, a migration of ions can be effectuated in the arrangement of FIGURE 3 in a manner similar to that for the apparatus of FIGURE 1.

What is claimed is:
1. A method of making glass sheet comprising:
 (a) providing a bath of molten glass;
 (b) feeding molten glass from a surface region thereof to a sheet glass forming unit;
 (c) maintaining an atmosphere in contact with the surface of the bath;
 (d) applying an electric field between a subsurface layer of said bath and the atmosphere; and
 (e) effecting controlled diffusion of at least one type of ions into or out of at least one surface region of said molten glass; said controlled diffusion consisting essentially of (1) maintaining the electric field such that the polarity of the subsurface layer of said bath, which contains exchangeable ions, is positive with respect to that of said atmosphere, (2) maintaining the electric field such that the polarity of said atmosphere is positive with respect to that of the subsurface layer of said bath, which contains exchangeable ions thereby increasing diffusion from the atmosphere into the glass and/or increasing migration from the upper surface region of the molten glass into interior layers thereof or (3) maintaining the electric field such that the strength and direction thereof produces a diffusion into the surface layer of said glass bath of beneficial ions contained in said atmosphere.

2. A method according to claim 1, wherein said atmosphere contains ions beneficial to the glass sheet formed from the bath of molten glass and the electric field is of a strength and direction to produce a diffusion of the beneficial ions from said atmosphere into the surface layer of said glass bath.

3. A method according to claim 2 wherein at least some of the ions diffusing into said glass bath act to modify at least one of the chemical, mechanical, or optical properties of the resulting glass product.

4. A method according to claim 3 wherein the ions which are caused to diffuse into said molten bath are selected from the group consisting of calcium, magnesium, barium, lead, tin, iron, manganese, nickel, cobalt, copper, selenium and alkali metals.

5. A method according to claim 3 comprising the further step of discharging an ionized substance into the region of said atmosphere traversed by said electric field.

6. A method according to claim 1 wherein said step of applying an electric field is carried out by applying at least two electric fields which traverse said molten glass bath at different surface regions thereof.

7. A method according to claim 1 comprising the further step of drawing said glass into sheets in said sheet glass forming unit.

8. Apparatus for use in the manufacture of sheet glass, comprising, in combination:
(a) a sheet glass forming unit;
(b) a vessel for holding a bath of molten glass and for maintaining an atmosphere in contact with such bath;
(c) means for feeding molten glass from such bath to the forming unit and for causing such molten glass to be formed into a sheet; and
(d) means for applying an electric field between such atmosphere and a subsurface layer of such bath.

9. Apparatus as defined in claim 8 wherein said forming unit is in the form of a glass drawing unit.

10. Apparatus as defined in claim 8 wherein said means for applying an electric field comprises a plurality of electrodes disposed at different levels in said vessel.

11. Apparatus as defined in claim 8 further comprising means for introducing an ionized material into said vessel in a region above said glass bath which is traversed by said electric field.

12. Apparatus as defined in claim 10 wherein at least one of said electrodes constitutes a lower electrode and is mounted in said vessel on a structural member thereof.

13. Apparatus as defined in claim 10 wherein said electrodes include at least one lower electrode and at least one upper electrode arranged for providing electric fields having different strengths in different regions across such molten bath.

References Cited

UNITED STATES PATENTS

| | | | |
|---|---|---|---|
| 2,596,515 | 5/1932 | Watkins, et al. | 204—30 |
| 3,393,987 | 7/1968 | Plumat | 65—30 |
| 3,193,365 | 7/1965 | Plumat | 65—23 |
| 3,218,220 | 11/1965 | Weber | 161—1 |
| 3,337,322 | 8/1967 | Taylor | 65—32 |

FOREIGN PATENTS 620,787  8/1962  Belgium.

S. LEON BASHORE, Primary Examiner

J. H. HARMAN, Assistant Examiner

U.S. Cl. X.R.

65—32, 90, 188, 196; 204—286